(12) United States Patent
Busch et al.

(10) Patent No.: US 8,630,534 B2
(45) Date of Patent: Jan. 14, 2014

(54) HEATING SYSTEM AND COMPONENT WITH SUCH A HEATING SYSTEM

(75) Inventors: Heinz-Peter Busch, Weyhe (DE); Soeren Schumacher, Solingen (DE)

(73) Assignee: Airbus Operations GmbH, Hamburg (DE)

(*) Notice: Subject to any disclaimer, the term of this patent is extended or adjusted under 35 U.S.C. 154(b) by 1343 days.

(21) Appl. No.: 11/688,736

(22) Filed: Mar. 20, 2007

(65) Prior Publication Data

US 2007/0224406 A1  Sep. 27, 2007

Related U.S. Application Data

(60) Provisional application No. 60/784,215, filed on Mar. 20, 2006.

(30) Foreign Application Priority Data

Mar. 20, 2006 (DE) .................. 10 2006 012 647

(51) Int. Cl.
*H05B 3/20* (2006.01)

(52) U.S. Cl.
USPC .................................... 392/435; 219/213

(58) Field of Classification Search
USPC ......... 219/200, 202, 213, 530, 540, 544, 548; 428/292.1, 593; 244/129.1; 392/435
See application file for complete search history.

(56) References Cited

U.S. PATENT DOCUMENTS

| | | | | |
|---|---|---|---|---|
| 3,472,289 A * | 10/1969 | Riordan et al. | ........... | 139/425 R |
| 3,697,728 A * | 10/1972 | Stirzenbecher | ............... | 219/548 |
| 3,869,596 A * | 3/1975 | Howie | .......................... | 219/438 |
| 4,032,751 A * | 6/1977 | Youtsey et al. | ............... | 219/538 |
| 5,298,722 A * | 3/1994 | Tanaka | .......................... | 219/545 |
| 5,351,918 A * | 10/1994 | Giamati et al. | ........... | 244/134 D |
| 5,475,204 A * | 12/1995 | Giamati et al. | ............... | 219/548 |
| 5,925,275 A * | 7/1999 | Lawson et al. | ................ | 219/543 |
| 5,971,323 A * | 10/1999 | Rauch et al. | ............... | 244/134 D |
| 6,054,690 A * | 4/2000 | Petit et al. | ..................... | 219/528 |
| 6,194,685 B1 * | 2/2001 | Rutherford | ................... | 219/201 |
| 6,237,874 B1 * | 5/2001 | Rutherford et al. | ........ | 244/134 E |
| 6,330,986 B1 * | 12/2001 | Rutherford et al. | ........ | 244/134 E |
| 6,834,159 B1 * | 12/2004 | Schramm | ...................... | 392/435 |
| 2002/0096506 A1 * | 7/2002 | Moreland et al. | ............ | 219/202 |
| 2005/0006529 A1 * | 1/2005 | Moe et al. | ................. | 244/134 D |

FOREIGN PATENT DOCUMENTS

| | | |
|---|---|---|
| DE | 1778570 | 3/1972 |
| DE | 19647935 A1 | 5/1998 |
| DE | 19918736 A1 | 11/2000 |
| DE | 29724855 U1 | 11/2004 |
| DE | 29825103 U1 | 12/2004 |
| DE | 10327342 A1 | 1/2005 |
| WO | 01/17850 A1 | 3/2001 |
| WO | 2004/039134 A2 | 5/2004 |

* cited by examiner

Primary Examiner — Brian Jennison

(74) Attorney, Agent, or Firm — Christopher Paradies; Paradies Law P.A.

(57) ABSTRACT

A heating system according to the invention comprises a heating layer that is integrated into a prepreg layer of a high-resistance prepreg material. The heating layer may comprise a bonded heating fabric, a metal oxide coating or electrically conductive threads. According to the invention, the heating system is integrated into a component to be heated. This component may consist, for example, of a floor panel for an aircraft.

13 Claims, 2 Drawing Sheets

HEATING SYSTEM AND COMPONENT WITH SUCH A HEATING SYSTEM

REFERENCE TO RELATED APPLICATIONS

This application claims the benefit of the filing date of U.S. Provisional Patent Application No. 60/784,215 filed Mar. 20, 2006 and of German Patent Application No. 10 2006 012 647.5 filed Mar. 20, 2006, the disclosure of each of these applications being hereby incorporated by reference herein.

FIELD OF THE INVENTION

The field relates to a heating system and a component with an integrated heating system. The field also relates to a panel heating system that may be integrated into a cabin component of an aircraft.

TECHNOLOGICAL BACKGROUND

In an aircraft cabin, floor panels with a separate heater are used in certain areas, for example, in the immediate vicinity of doors and emergency exits. Known heating systems of the aforementioned areas utilize heating coil loops that are installed between two thin thermoplastic films with defined spacing. In order to protect the heating coil from impact damages, the regions in which the heater is installed are protected with a correspondingly thick aluminum plate.

SUMMARY OF THE INVENTION

An example of the invention provides for simplifying the installation of a heating system. For example, a floor component of an aircraft is heated, which may simultaneously realize an integration into other cabin components that are not yet heated.

An example of a heating system features a heating layer and at least two prepreg layers of a high-resistance prepreg material, wherein the heating layer is integrated between the prepreg layers during hardening/curing.

The term prepreg refers to reinforcing fibers that are pre-impregnated with reactive resin. The most commonly used prepregs are textile prepregs (Texipreg), but bands as well as unidirectional and multiaxial bonded fabrics/non-woven fabrics may be pre-impregnated. Texipregs are fabrics of glass, carbon and aramide fibers that are impregnated with epoxy or phenol resins. The resin matrix used primarily consists of modified epoxy and phenol resins that do not flow at room temperature. The prepreg is placed into the mould in the cold state and hardened under the influence of pressure and heat. The resin briefly liquefies during the warming up process and thusly embeds the fibers before it begins to harden.

In one example, the heating layer used consists of a nonwoven fabric/bonded fabric, the surfaces of which may be embedded between two prepreg layers such that an integrated layer is formed, and the bonded heating fabric may be integrated into one or more high-resistance prepreg layers.

The bonded heating fabric may be very thin, such as, no thicker than 0.3 mm. A bonded heating fabric of this type is sold, for example, by the firm TS Thermosysteme GmbH, Wuppertal, Germany, under the designation Low-Voltage Heater ("Niedervoltheizung").

In one example, the heating layer features a metal oxide coating that is applied (vapor-deposited) on a thin fabric/fibers and embedded between two prepreg layers. The prepreg layers contain a glass fabric for decoupling purposes.

The heating layer for integration into a cabin component of this example is based on the coating (vapor deposition with metal oxides) of thin glass fabrics. The temperatures required for reaching the necessary surface temperatures of the component at a given constant electric power may be adjusted based on defined ohmic resistances of the metal oxide layers. In order to achieve a constant temperature-dependent power density in the heated surface, the electric power may be supplied by means of strip conductors that have a comparatively very low resistance as compared to the resistance of the metal oxide layer. In order to realize an optimal power distribution in accordance with the different temperature fields, it is advantageous to arrange the plus and minus strip conductors on component edges of identical length that extend parallel to one another.

In another example, the heating layer contains electrically conductive threads that may be integrated into a high-resistance prepreg layer. In the manufacture of a glass fiber fabric, warp and/or weft threads with a defined electrical resistance may be woven into the fabric. If the power is adjusted to a constant level, different surface temperatures may be based on different distances of the electrically conductive threads from one another. After being cut in accordance with the respective panel geometry, the electrically conductive threads need to be electrically connected in parallel by means of a strip conductor that has a very low resistance in comparison with the individual threads. The electric transfer points may be arranged on these strip conductors.

In another example, the glass layer of the prepreg (high-resistance) contains a metal oxide layer with defined ohmic resistance on its surface. This prepreg layer is incorporated into the component, preferably on the upper side of the component (facing the passengers), and serves as a constructive semi-finished product. The temperatures required for reaching the necessary surface temperatures of the component at a given constant electric power may be adjusted based on defined ohmic resistances of the metal oxide layers. In order to achieve constant temperature-dependent power density in the heated surfaces, the electric power may be supplied by means of strip conductors with a very low resistance. In order to obtain an optimal power distribution of different temperature fields, the plus and minus strip conductors of identical length may be arranged on component edges that extend parallel to one another.

The heating system, in one example, may be integrated into a sandwich construction of a component, wherein the high-resistance prepreg layer of the heating system may be integrated with a honeycomb structure by means of a low-resistance prepreg layer on one side of the honeycomb structure. On the opposite side of the honeycomb structure, the honeycomb structure may be realized with an arbitrary prepreg layer, e.g., a carbon fiber-reinforced prepreg layer (CFK-prepreg).

BRIEF DESCRIPTION OF THE DRAWINGS

The drawings illustrate examples of the invention. The same or similar elements are designated with the same reference labels.

DETAILED DESCRIPTION OF AN EMBODIMENT

Figure 1:
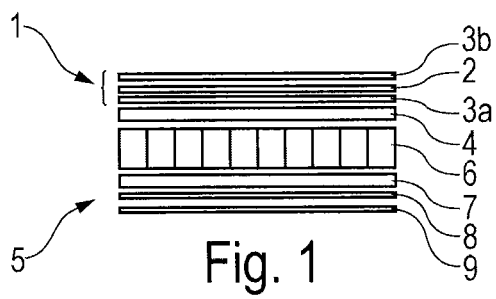
FIG. 1 shows a schematic side view of a heating system according to a first embodiment of the invention that is realized integrally with a component.

As shown in FIG. 1, a heating system 1 features a low-voltage bonded heating fabric 2 that is integrated into high-resistance prepreg layers 3a, 3b in a sandwich structure.

Figure 2:
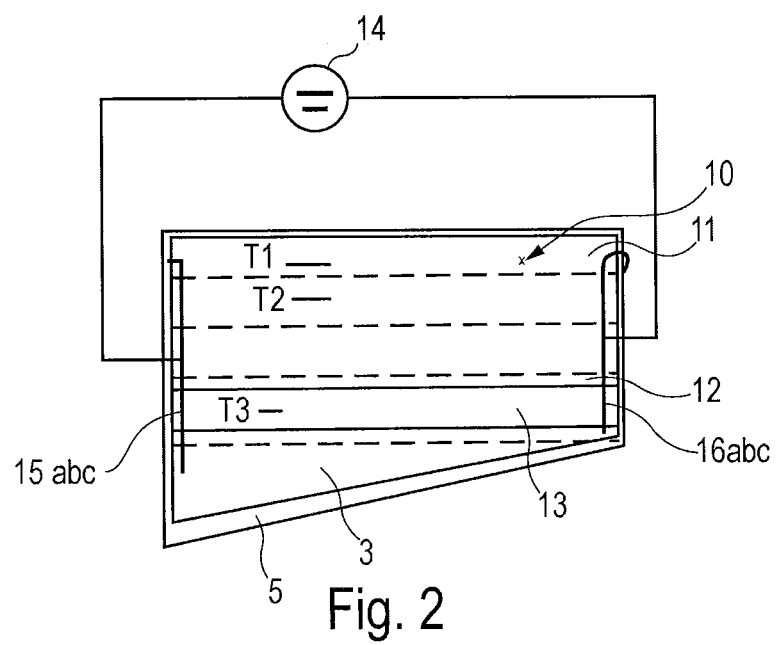
FIG. 2 shows a schematic representation of a heating system.
Figure 3:
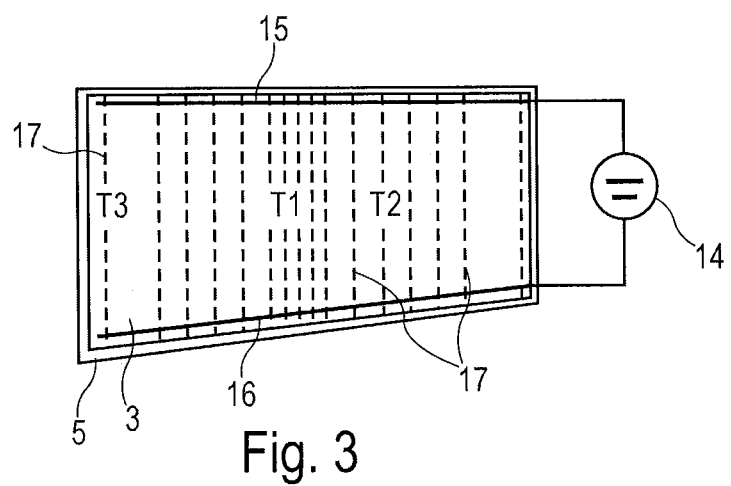
FIG. 3 shows a schematic view of a heating system.

The heating system 1 comprising the bonded heating fabric 2 and the high-resistance prepreg layers 3a, 3b is further integrated into a floor panel 5 of an aircraft, for example. The floor panel 5 may include a honeycomb 6, such as a resin-reinforced paper that forms part of a cabin component of an aircraft. A floor panel 5 of this example may be incorporated into an aircraft as any other floor panel, except that strip conductors 15, 16 at opposite sides of the floor panel 5, such as illustrated in FIGS. 2 and 3, must be connected to an electrical system of the aircraft. This may be accomplished using very many variations and combinations of electrical buses, which are not necessary to be shown in any further detail for a person of ordinary skill in the art to install the floor panels in an aircraft.

The heating system 1 is integrated with the honeycomb 6 by means of a low-resistance prepreg layer 4, which is sandwiched between the honeycomb 6 and the high resistance prepreg layer 3a as shown in FIG. 1, for example. The low-resistance prepreg layer 4 (e.g., CFK-prepreg) may comprise a carbon fiber fabric. The high-resistance prepreg layer 3a serves as a decoupling layer between the bonded heating fabric 2 and the low-resistance prepreg layer 4 in order to electrically decouple (i.e. insulate electrically) the bonded heating fabric 2 from the low-resistance prepreg layer 4. The prepreg layer 3b primarily serves as protection from wear and tear for the bonded heating fabric 2. The high-resistance prepreg layers 3a, b comprise, for example, a glass fiber fabric with correspondingly high resin content.

According to FIG. 1, arbitrary prepreg layers 7, 8, 9 are situated on the side of the honeycomb 6 that faces away from the bonded heating fabric 2. The prepreg layers 8, 9 may consist of the same material as the aforementioned prepreg layers 3a, b and the prepreg layer 7 may consist of the same material as the prepreg layer 4 in this example, such as prepreg layer 4 of a CFK fabric with epoxy matrix.

According to FIG. 1, it is possible to prevent the mechanical stability level (impact behavior) of the floor panel from being negatively altered by the bonded heating fabric 2 such that the required combustibility, smoke gas density and toxicology tests prescribed for the floor panels of an aircraft are not negatively influenced.

Figure 2A:
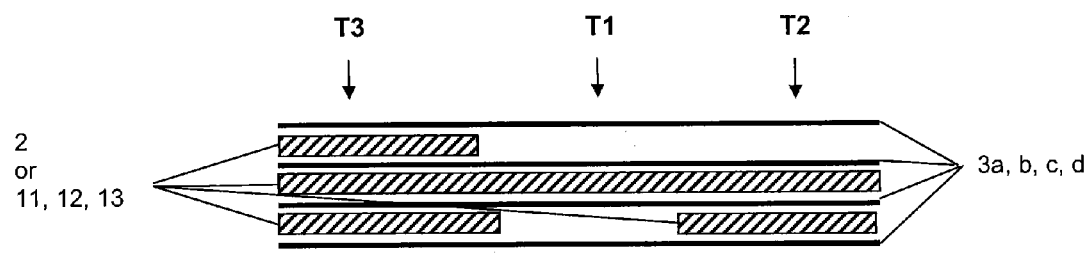
FIG. 2a shows a schematic side view of a heating system.

FIGS. 2 and 2a show a heating system 10 having surface area regions that require more substantial heating than other regions. Additional bonded fabric layers 2 or glass layers 11, 12, 13 coated with metal oxide may be used to obtain a pattern of different surface temperatures on the surface of the floor panel. Each of these additional layers needs to be electrically decoupled from one another by at least one high-resistance prepreg 3a, b, c, d.

The ohmic resistance of the metal oxide layers 11, 12, 13 or the bonded heating fabrics 2 may be defined differently and therefore makes it possible to adjust the temperatures required for reaching the necessary surface temperatures of the component in the desired pattern.

According to FIG. 2, the metal oxide coatings 11, 12, 13 are applied on the glass fabric surface with constant sheet resistance in order to generate the different temperatures T1, T2, T3 and, if so required, to locally adjust different temperature levels.

The heating system 10 of this example may be integrated into the floor panel 5 similar to the heating system 1 of the previous example.

In one example, FIG. 2 shows schematically that the metal oxide coatings 11, 12, 13 may be supplied with energy by means of a voltage supply 14 as os well known in the art. The voltage supply need not be shown in more detail. The metal oxide coatings 11, 12, 13 are separately coupled to a voltage supply 14 connected to one another by means of plus and minus strip conductors 15a, 15b, 15c and 16a, 16b, 16c, wherein the plus and minus strip conductors 15, 16 are correspondingly connected to the plus and minus poles of the voltage supply 14. This allows a varying or identical control of the temperature level. The plus and minus strip conductors 15a, 15b, 15c and 16a, 16b, 16c may extend parallel to one another and over the same length along opposite edges of the heating system 10 separated only by the high resistance prepreg layers 3b, 3c, for example.

In FIG. 3, a heating system 15 contains electrically conductive threads 17 (illustrated with broken lines) with defined electric resistances that may be incorporated into a glass fiber prepreg layer (high-resistance prepreg layer) at different distances from one another in order to achieve a pattern of temperature T3, T2, T1 on the surface of an aircraft components, such as a floor panel 15, which is shown schematically with labels T1, T2 and T3.

In regions in which the electrically conductive threads 17 lie very close to one another, correspondingly higher temperatures are reached than in the regions in which the electrically conductive threads 17 are farther spaced apart from one another. This means that T1>T2>T3 applies.

The electrically conductive threads 17 may be connected to a voltage supply source 14 using plus and minus strip conductors 15, 16.

Figure 4:
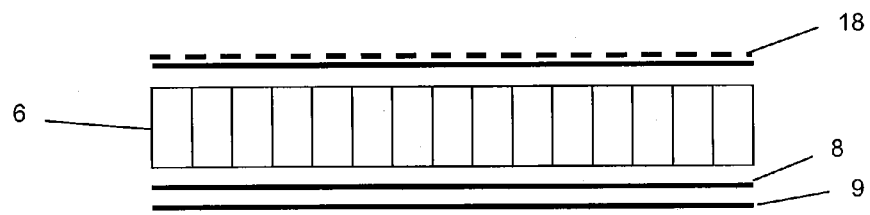
FIG. 4 shows a schematic side view of a heating system.

FIG. 4 shows a heating system having a preapplied metal oxide layer on a surface of a metal-oxide glass layer 18 of a (high-resistance) prepreg with defined ohmic resistance. A high resistance prepreg layer 8 insulates the metal-oxide, glass layer from a honeycomb 6, which is protected or its opposite side by one or more prepreg layers 8, 9. In order to achieve a constant temperature-dependent power density in the heated surfaces, the electric power is supplied by means of strip conductors 15, 16 that have a very low resistance compared to the metal oxide layer. In order to realize an optimal power distribution in accordance with the different temperature fields, it is advantageous to arrange the plus and minus strip conductors over the same length at component edges that extend parallel to one another.

Alternative combinations and variations of the examples provided will be apparent based on this disclosure. It is not possible to provide specific examples for all of the many possible combinations and variations of the embodiments described.

The invention was furthermore described in connection with a floor panel in an aircraft. The inventive heating system is also suitable for other fields of application. In addition, the inventive heating system may also be integrated into lateral trim components of the passenger cabin or into cargo room trim panels.

LIST OF REFERENCE SYMBOLS

1 Heating system
2 Bonded heating fabric 3a, b, c, d High-resistance prepreg layer
4 Low-resistance prepreg layer
5 Floor panel (component)
6 Honeycomb
7 Low-resistance prepreg layer
8, 9 High-resistance prepreg layer
10 Heating system
11 First metal oxide coating
12 Second metal oxide coating
13 Third metal oxide coating
14 Voltage supply source
15a, b, c Plus strip conductors
16a, b, c Minus strip conductors
17 Threads
18 Metal oxide-coated glass fiber fabric pre-impregnated with a resin system in the form of a constructive prepreg

The invention claimed is:

1. A heating system for use in an aircraft, comprising:
   a fabric heating layer comprised of a low voltage heating fabric; and
   a plurality of high-resistance prepreg layers of a prepreg material having a high electrical resistance such that the prepreg material serves as an electrical insulator,
   wherein the heating layer is integrated into a sandwich structure such that the heating layer is disposed between two of the plurality of high-resistance prepreg layers and
   wherein the heating layer comprises at least one metal oxide coating on a surface of the fabric heating layer such that the at least one metal oxide coating is electrically conductive.

2. The heating system of claim 1, wherein the fabric heating layer includes non-woven fibers.

3. The heating system of claim 1, wherein the fabric heating layer comprises at least two metal oxide coatings selected to have substantially different ohmic resistances.

4. The heating system of claim 2, wherein the fabric heating layer includes a plurality of electrically conductive threads that are woven into the non-woven fibers of the fabric heating layer.

5. The heating system of claim 4, wherein each of the plurality of electrically conductive threads are arranged having a distance from a nearest neighboring one of the plurality of electrically conductive threads, the distance being selected such that a pattern of different temperatures, is obtained on the surface of the heating system during resistive heating of the plurality of electrically conductive threads using a common cathode strip conductor and a common anode strip conductor electrically coupled to opposite ends of the plurality of electrically conductive threads.

6. The heating system of claim 1, wherein the heating layer is further comprised of at least one metal oxide coating that is applied on a surface of one of the high-resistance prepreg materials integrated into the integrated layer.

7. A component with the heating system of claim 1, further comprising a honeycomb structure integrally coupled to the sandwich structure using a first low-resistance prepreg layer having a lower electrical resistivity than the plurality of high-resistance prepreg layers and being disposed between the sandwich structure and the honeycomb structure.

8. The component of claim 7, wherein the honeycomb structure has a second low-resistance prepreg layer having a lower electrical resistivity than the plurality of high-resistance prepreg layers and being disposed on a side of the honeycomb structure opposite of the sandwich structure.

9. The component of claim 7, wherein the component of claim 8 is a floor panel of an aircraft and is electrically coupled to a voltage supply of the aircraft.

10. An aircraft comprising the component of claim 7 and a voltage supply coupled to the heating layer.

11. The heating system of claim 1, wherein the heating layer is bonded between the two of the plurality of high-resistance prepreg layers by liquefying a resin of the two of the plurality of high-resistance prepreg layers under the influence of pressure and heat, embedding fibers of the fabric heating layer in the resin prior to hardening of the resin.

12. The component of claim 9, wherein the floor panel includes a cathode strip conductor and an anode strip conductor disposed on opposite sides of the fabric heating layer, electrically coupling the heating layer of the floor panel to the voltage supply of the aircraft.

13. The heating system of claim 4, wherein the non-woven fibers are of glass.

* * * * *